UNITED STATES PATENT OFFICE.

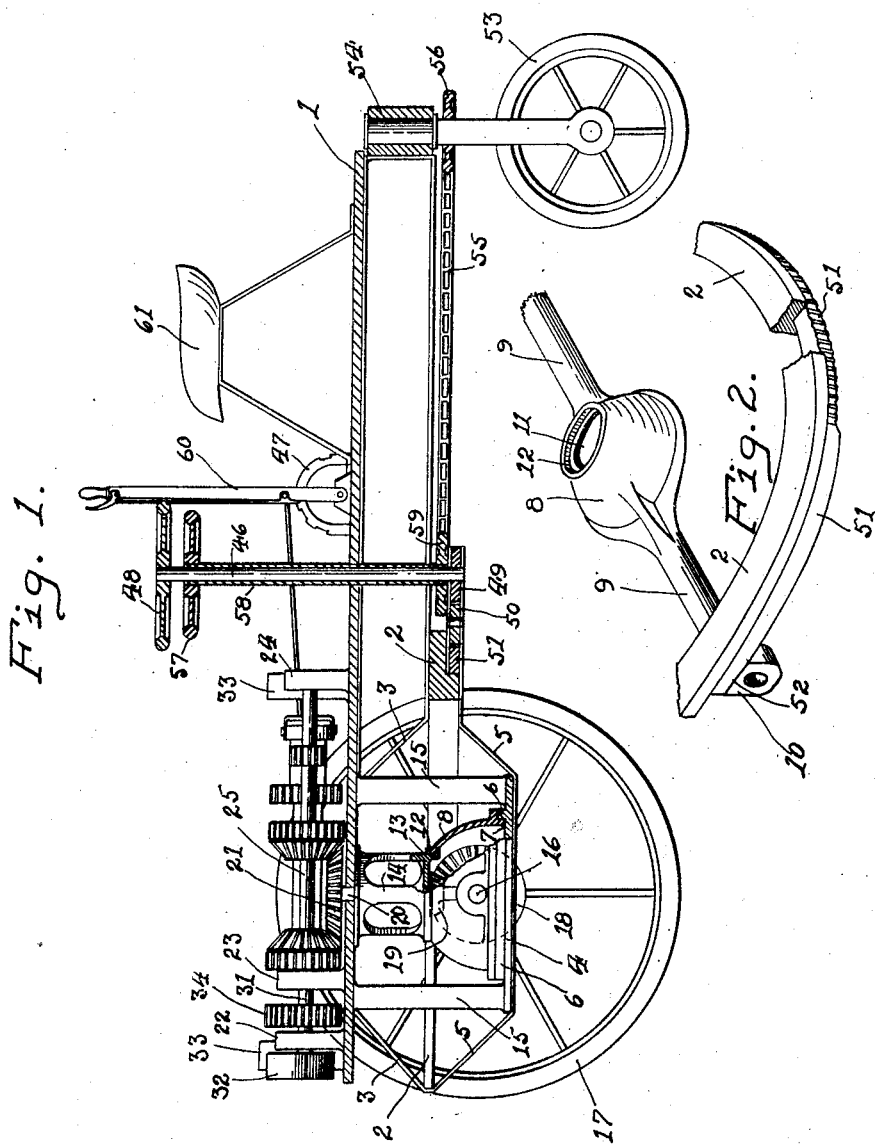

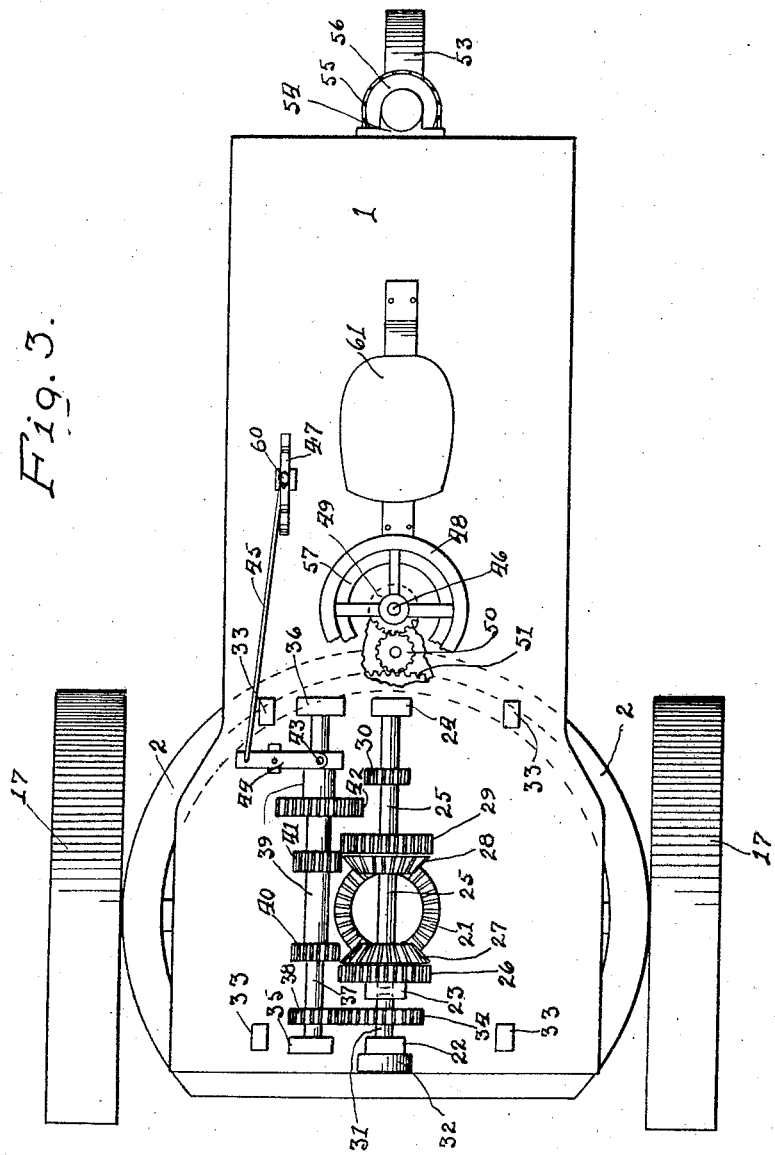

JOHN G. KERST, OF SPRINGFIELD, ILLINOIS.

MOTOR-DRIVEN TRUCK.

1,139,981.  Specification of Letters Patent.  Patented May 18, 1915.

Application filed September 20, 1913. Serial No. 790,817.

*To all whom it may concern:*

Be it known that I, JOHN G. KERST, a citizen of the United States, residing at Springfield, in the county of Sangamon and State of Illinois, have invented new and useful Improvements in Motor-Driven Trucks, of which the following is a specification.

My invention relates to improvements in motor driven trucks, and refers more particularly to trucks adapted to propel agricultural implements.

An object of my invention is to provide a motor truck to which may be attached the ordinary farm implements, such as plows, harrows, planters, cultivators, harvesters, and the like, and which device will propel such instruments along while they are performing their various functions in the usual manner.

Another object is to provide a truck in which the power driving said device will be applied to the forward axle and wheels, and in which the remainder of the machine will be merely drawn along by said forward unit.

A further object is to provide means for shifting the forward axle and wheels of such a truck, so that the steering thereof may be accomplished by said forward unit, and to incorporate therewith an auxiliary steering device whereby a trailing caster wheel may be actuated to assist the forward unit and to facilitate the steering of the truck.

With the foregoing and other objects in view, my invention consists of certain peculiarities in construction and arrangement of the various parts, which will be hereinafter fully described, illustrated in the accompanying drawings, and pointed out in and by the appended claims.

In the accompanying drawings wherein is illustrated the preferred embodiment of my invention, like numerals of reference refer to like or corresponding parts throughout the several views.

Figure 1 is a side view of the truck of my invention, partly in elevation and partly in section. Fig. 2 is a fragmentary detail view of the forward axle housing, together with the bearing ring and steering gear. Fig. 3 is a plan view of the truck, a portion of the frame being broken away to show more clearly the steering mechanism.

Referring now to the drawings, numeral 1 designates in general the frame work of a truck, beneath which is suspended arcuate bearing ring 2 by brackets 3 adjacent the forward end. Beneath bearing ring 2, a fifth wheel bearing plate 4 is suspended by brackets 5 and columns 15, bearing plate 4 being provided with a raised circular bearing ring 6 adapted to receive a male bearing ring 7 carried on the lower side of the central bowl 8 of the forward axle housing casting.

The axle housing casting is designated in general as 9 and is provided with box bearings 10 on both ends thereof, and central bowl 8 adjacent the center. The upper side of the bowl portion is provided with a circular opening 11, and a female bearing ring 12 into which is adapted to fit male bearing ring 13 carried by cylindrical bearing casting 14. Bearing casting 14 is stationary and is attached to frame 1 at its upper end.

Numeral 16 designates an axle which extends through housing casting 9 and box bearings 10, and which has keyed or suitably fastened thereto traction wheels 17 positioned just outside of the box bearings 10. Axle 16 is provided with a bevel gear 18 keyed thereto, which gear is positioned within housing bowl 18, and which gear is adapted to mesh with a bevel gear 19 carried by a vertical drive shaft 20. On the upper end of vertical drive shaft 20 is a bevel drive gear 21, which is positioned just above the platform of frame 1.

Pedestals designated as 23 and 24 are positioned on the platform of frame 1 and are adapted to provide bearing rests for a longitudinally extending shaft 25, which shaft extends only part way through pedestal 23. Shaft 25 is provided with a loose spur and bevel gear unit designated respectively by numerals 26 and 27, which gears are united and revolve freely together on shaft 25. A corresponding pair of fixed gears 28 and 29, are carried by shaft 25 and are keyed, or otherwise suitably fastened to revolve with said shaft. The two bevel gears 27 and 28 which are adapted to mesh with drive gear 21 are positioned on opposite sides thereof. A third spur gear is positioned between gear 29 and pedestal 24 for a purpose which will be hereinafter fully explained. A pedestal 22 which is positioned in line with pedestals 23 and 24, is adapted to carry a shaft 31 in conjunction with the forward half of pedestal 23. A pulley such as 32 is carried by shaft 31 just in front of pedestal 22, which pulley is adapted to be driven by an engine (not shown) carried on blocks 33 erected on platform 1. Shaft 31 is provided between pedestals 22 and 23 with a spur gear 34. Parallel to shafts 25 and 31, and carried by bearing pedestals 35 and 36, is mounted a transmission shaft 37. A spur gear 38 is keyed to said shaft and is adapted to mesh with gear 34 carried by shaft 31. A sleeve 39 is slidably keyed to shaft 37, and is provided with spur gears 40, 41 and 42, which gears are adapted to be meshed, respectively, when sleeve 39 is properly placed, with gears 26, 29 and 30 carried by shaft 25.

In order to effect the sliding of sleeve 39 and gears 40, 41 and 42, on shaft 37, a yoke 43 and lever 44 is provided, which are controlled through the medium of link 45 by hand lever 60 mounted with quadrant 47.

It will be readily seen that when pulley 32 is actuated in a counter-clockwise direction by an engine or motor, that gear 34 will actuate shaft 37 in a clockwise direction through the medium of gear 38. Gears 40, 41 and 42 will likewise be actuated. By throwing hand lever 60 forward, gear 40 will be thrown into mesh with gear 26 and bevel gear 27 will be rotated in a counter-clockwise direction. Since bevel gear 27 is in mesh with drive gear 21, shaft 20 and bevel gears 19 carried on its lower end will be rotated in a clockwise direction, as will bevel gear 18 mounted on axle 16. This will actuate the truck backward. When gear 41 is thrown into mesh with gear 29 by the shifting of sleeve 39, shaft 25, gear 28, drive gear 21 and bevel gears 19 and 18 will actuate the truck forward at slow speed, and when gear 42 is in mesh with gear 30 the truck will be driven forward at high speed.

The method of steering my truck will now be explained. A steering post 46 is provided in advance of driver seat 61 and a steering wheel 48 is fixed to the upper end thereof. On the lower end of post 46 is a gear 49 meshing with gear 50 which gear 50 is adapted to mesh with a large steering gear 51 carried between bearing ring 2 and box bearings 10 on axle housing 9. Gear 51 is attached to the horizontal faces 52 on the upper side of bearings 10 and is stationary therewith. It will be seen that when gear 51 is actuated by gear 50, that the axle housing 9, axle 16, and wheel 17 will be rotated about the pivoting bearing in the fifth wheel plate 4 and bearing rings 13 of casting 14. To further facilitate the steering of my truck, the rear supporting steering wheel 53 mounted to frame 1 by bearing casting 54, may be rotated by means of chain 55 about sprocket wheel 56 carried by said wheel, and actuated by steering wheel 57, steering tube 58, and sprocket wheel 59 carried by the steering tube.

From the foregoing description it will be readily seen that my invention provides a truck adapted for agricultural purposes, which provides a method of drawing such a vehicle by applying the power to the front wheels thereof and which provides a method of steering through the medium of a fifth wheel, while the power is being applied to such a unit.

While I have described the preferred embodiment of my invention, I do not wish to be limited thereto except for such limitations as the claims may import, as it is obvious that the details of construction and arrangement of parts may be varied in many ways.

Having thus described my invention, what I claim is:—

1. In a motor driven truck, a motor driven forward axle carried by an axle housing casting, an axle housing casting having box bearings and truck supporting faces at each end, a central housing bowl in said housing casting providing pivoting means therefor, a fifth wheel bearing plate carried by a truck frame providing a female bearing ring for the lower side of said housing bowl, a bearing cylinder further supporting a truck frame and providing a male bearing ring for the upper side of said housing bowl, a steering gear carried by truck supporting faces on said axle housing casting, a bearing ring suspended beneath a truck frame and supported by said steering gear, said fifth wheel bearing plate and said bearing cylinder together with said bearing ring forming a stationary bearing unit, said axle housing casting rotatable in said stationary bearing unit for the steering of the truck, a truck frame, traction wheels on said forward axle, and a trailing steering wheel, substantially as described.

2. In a motor driven truck, a truck frame supported at the rear by a trailing caster wheel, a fifth wheel bearing plate suspended beneath the forward end of said truck, a bearing cylinder supported from said truck parallel to and above said fifth wheel bearing plate, a motor driven forward axle, an axle housing casting carrying said axle positioned between said bearing cylinder and said fifth wheel bearing plate, a central bowl on said axle housing adapted to mesh with and to rotate between said bearing cylinder and said fifth wheel bearing plate, box bearings on said axle housing casting having supporting faces for a steering gear, a steering gear fixed to said supporting faces, a circular bearing ring suspended from a truck frame and adapted to rest on said steering gear, means for rotating said axle housing in said fifth wheel bearing plate and said bearing cylinder and beneath said bearing ring, traction wheels on said axle, and a trailing steering wheel, substantially as described.

3. In a motor driven truck, the combination with a forward axle, of a bevel gear carried by said axle, a vertical shaft at right angles to said axle, a bevel gear on the lower end of said vertical shaft adapted to mesh with the bevel gear carried by said axle, a bevel drive gear on the upper end of the vertical shaft, a longitudinally extending shaft carried above said bevel drive gear, a bevel and spur gear unit keyed to said longitudinally extending shaft, the bevel gear of said keyed gear unit being in mesh with said bevel drive gear, a bevel and spur gear unit loosely carried by said longitudinally extending shaft and freely rotatable on said shaft, the bevel gear of said loose gear unit being in mesh with said bevel drive gear, a third spur gear keyed to said shaft and rotatable therewith, a motor-actuated pulley, a shaft actuated by said pulley, a spur gear carried by said pulley actuated shaft, a transmission shaft parallel to said longitudinally extending shaft, a spur gear on said transmission shaft adapted to mesh with the gear carried by said pulley actuated shaft, a shifting sleeve carried by said transmission shaft, spur gears on said transmission shaft adapted to mesh with spur gears carried by said longitudinally extending shaft when the shifting sleeve is suitably placed, a yoke and lever controlled by a link and hand lever for actuating said shifting sleeve, traction wheels on said forward axle, a truck frame, and a trailing steering wheel, substantially as described.

JOHN G. KERST.

Witnesses:
LEO MATTHEWS,
SARAH SCHWARTZ.